(No Model.) 2 Sheets—Sheet 2.

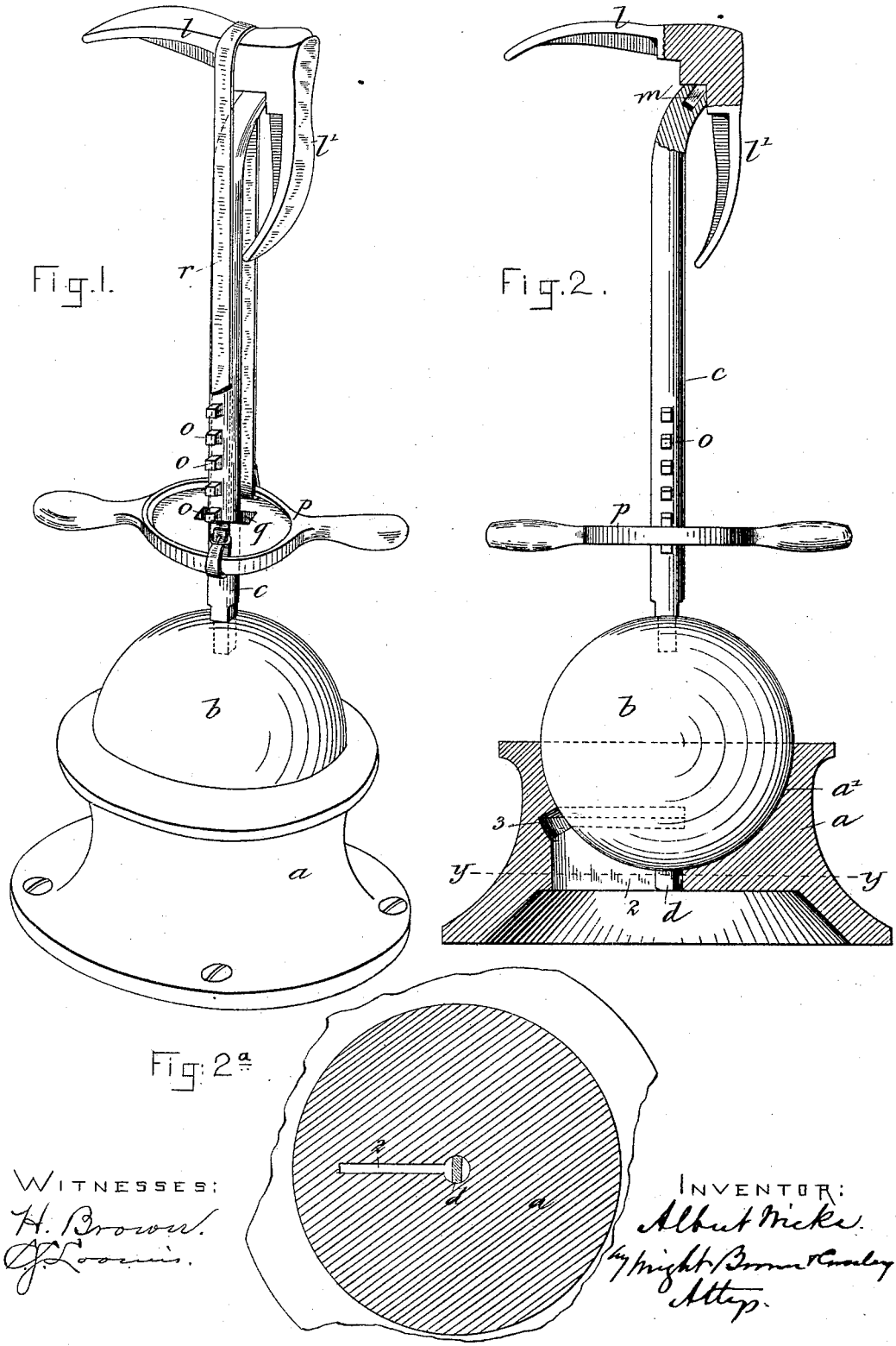

A. WICKS.
JACK FOR BOOTS OR SHOES.

No. 342,155. Patented May 18, 1886.

WITNESSES:
H. Brown.
C. J. Loomis.

INVENTOR:
Albert Wicks
by Wright Brown & Cooley
Attys.

UNITED STATES PATENT OFFICE.

ALBERT WICKS, OF SOMERVILLE, MASSACHUSETTS.

JACK FOR BOOTS OR SHOES.

SPECIFICATION forming part of Letters Patent No. 342,155, dated May 18, 1886.

Application filed March 19, 1886. Serial No. 195,824. (No model.)

*To all whom it may concern:*

Be it known that I, ALBERT WICKS, of Somerville, in the county of Middlesex and State of Massachusetts, have invented certain new and useful Improvements in Jacks, of which the following is a specification.

This invention has for its object to provide a simple and convenient shoe-maker's jack, adapted to support a boot or shoe in any position that may be desired by the operator, and also to provide a double or multiple last, adapted to hold several sizes of boots or shoes, and constructed to accompany said jack.

The invention consists in a jack composed of a base having a hemispherical socket, and adapted to be secured to a floor or other support, said socket having a groove in its surface, a ball fitting said socket, and having a stud entering said grooves, and a post or shank supported by said ball and adapted to support a last at its upper end, said post or shank being supported in any desired position by the engagement of the stud on the ball with the grooves in the socket.

The invention also consists in the means for holding the last and the boot or shoe therein in position on the jack.

The invention also consists in the combination, with the curved post or shank, of a double or multiple last composed of two parts rigidly connected or formed integral with each other, one of said parts being at about a right angle with the other, said last being provided with a pin adapted to enter a socket formed on the post or shank, all of which I will now proceed to describe and claim.

Figure 3:
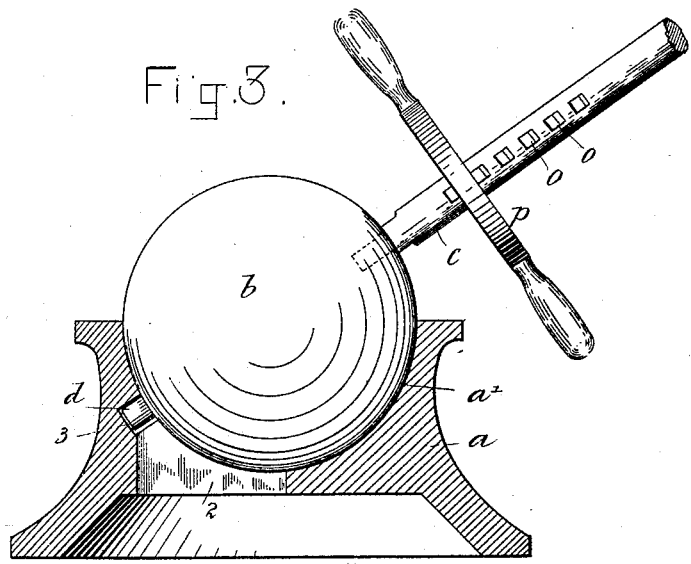
Figure 4:
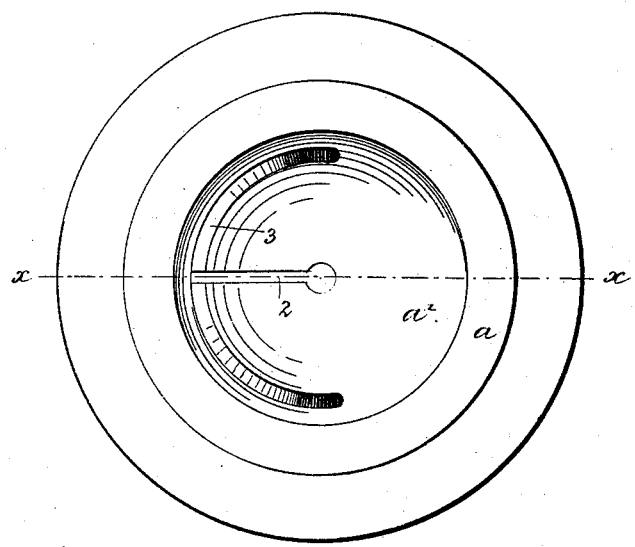

Of the accompanying drawings, forming a part of this specification, Figure 1 represents a perspective view of my improved jack and last. Fig. 2 represents a side elevation showing a section of the socketed base and of portions of the last and post. Fig. 2ᵃ represents a section on line *y y*, Fig. 2. Fig. 3 represents a similar view to Fig. 2, the post being shown in an inclined position and its upper end broken away. Fig. 4 represents a top view of the base.

The sectional views of the base shown in Figs. 2 and 3 are on the plane of line *x x*, Fig. 4.

The same letters of reference indicate the same parts in all the figures.

In the drawings, *a* represents the base of my improved jack, the same being a casting of suitable strength, having a socket, *a'*, which is hemispherical, or substantially so. In the surface of said socket are formed two grooves, 2 3, the groove 2 extending horizontally about half-way around the socket between the center and margin of the latter, and the groove 3 extends from the center of the socket outwardly to and into the groove 2.

*b* represents a ball formed to fit and turn freely in the socket, and *c* represents a post or shank rigidly attached to one side of said ball, and *d* represents a short stud projecting from the ball at a point opposite to the shank *c*. Said stud is formed to enter either of the grooves in the socket *a*, and by its bearing against the sides of the groove into which it projects, holding the ball with the post or shank. When the stud *d* projects into the inner end of the groove 2, as shown in Figs. 2 and 2ᵃ, it holds the ball with the shank *c* in a substantially vertical position. The stud *d* is oblong and of greater width than the main portion of the groove 2, and the inner end of said groove is enlarged, so that the stud can be turned therein crosswise of the main portion of the groove, as shown in Fig. 2ᵃ, the ball being thus locked, so that the shank cannot be moved from a vertical position until the stud *d* is turned so that it may enter the main portion of the groove 2, when the ball may be rotated until the stud *d* reaches the groove 3. The last-named groove has its sides inclined toward the center of the ball, and is formed to receive the stud *d*. When the stud is in the groove 3, the shank *c* stands in an inclined position, as shown in Fig. 3—in this case at an angle of about ninety degrees—and by turning the ball, so as to cause the stud *d* to move along the groove 3 the direction of the inclination of the shank may be varied, as desired. It will be seen, therefore, that the shank may be caused to assume a variety of positions, and is supported with sufficient firmness by the grooves 2 3 and stud *d* in any position to which it may be moved.

The last used with this improved jack may be of any suitable kind. I prefer to use the double last shown in Figs. 1 and 2, the same being composed of two lasts, *l l'*, united at their heels, and arranged, substantially, at right angles with each other. A square pin, m, projects diagonally from the double last, as shown in Fig. 2, and is adapted to enter a square hole formed to receive it in the upper end of the shank c, said upper end being somewhat inclined or curved, to offset it from the main portion of the shank, so that the last not in use may stand beside the shank. The two lasts are preferably of different sizes, so that they can be used with different sizes of boots and shoes. The shank c is provided with a series of teeth or projections, o, or, as I prefer, with two series, one at each side.

p represents a cross-bar, which is slotted at q to receive the shank, said slot being of such length that when it is turned to one position it will receive the projections o and permit the bar p to move freely up and down on the shank; but its width is such that when turned at right angles with said position its edges will interlock with the teeth o. A strap, r, is attached to the bar p, and passes over the last, as shown in Fig. 1. The cross-bar may be locked at any desired height on the shank by means of the teeth o, said cross-bar, teeth, and strap being the means for holding the work on the last.

I claim—

1. The improved jack, composed of the socketed and grooved base, the ball fitting the socket and having a stud entering the grooves therein, and the post or shank secured to the ball, said grooves being formed to support the post or shank either in a vertical position or at various inclinations by their engagement with the stud on the ball, as set forth.

2. In a jack, the post or shank adapted to hold a last at its upper end and provided with a series of teeth or projections, combined with the cross-bar having a central slot adapted to be engaged with the projections of the post and held at various heights thereby, and the strap secured at its ends to the cross-bar and adapted to pass over the last, as set forth.

3. The base having the grooves 2 and 3, the former having the enlarged inner end, combined with the ball having the last-holding shank or post and the oblong stud d, formed to lock the ball and shank by its engagement with the enlarged end of the groove 2, as set forth.

4. In a jack, the shank c, having the inclined or offset upper end containing a diagonal socket, combined with the double last composed of two parts, l l', united at their heel portions and arranged substantially at right angles to each other, and provided with the diagonal pin m, formed to enter the socket in the shank, as set forth.

In testimony whereof I have signed my name to this specification, in the presence of two subscribing witnesses, this 15th day of March, 1886.

ALBERT WICKS.

Witnesses:
A. W. WHITTIER,
C. F. BROWN.